(12) United States Patent
Moussette et al.

(10) Patent No.: US 11,521,477 B2
(45) Date of Patent: *Dec. 6, 2022

(54) PROVIDING PRIMING CUES TO A USER OF AN ELECTRONIC DEVICE

(71) Applicant: Apple Inc., Cupertino, CA (US)

(72) Inventors: Camille Moussette, Los Gatos, CA (US); Hugo D. Verweij, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/221,197

(22) Filed: Apr. 2, 2021

(65) Prior Publication Data

US 2021/0225154 A1 Jul. 22, 2021

Related U.S. Application Data

(63) Continuation of application No. 16/210,562, filed on Dec. 5, 2018, now Pat. No. 10,984,649, which is a continuation of application No. 14/562,465, filed on Dec. 5, 2014, now Pat. No. 10,186,138.

(60) Provisional application No. 62/044,982, filed on Sep. 2, 2014.

(51) Int. Cl.
| | |
|---|---|
| *G06F 3/01* | (2006.01) |
| *H04M 1/72454* | (2021.01) |
| *G08B 21/24* | (2006.01) |
| *G06F 1/16* | (2006.01) |
| *H04M 19/04* | (2006.01) |
| *H04M 1/72412* | (2021.01) |

(52) U.S. Cl.
CPC .............. *G08B 21/24* (2013.01); *G06F 1/163* (2013.01); *G06F 3/016* (2013.01); *H04M 19/044* (2013.01); *H04M 1/72412* (2021.01); *H04M 1/72454* (2021.01)

(58) Field of Classification Search
None
See application file for complete search history.

(56) References Cited

U.S. PATENT DOCUMENTS

| | | | |
|---|---|---|---|
| 5,333,299 A | 7/1994 | Koval et al. | |
| 5,422,635 A * | 6/1995 | Morishima | G08B 3/105 340/7.32 |
| 5,508,688 A * | 4/1996 | Mochizuki | G08B 3/1025 455/343.1 |
| 5,642,171 A | 6/1997 | Baumgartner et al. | |
| 5,696,497 A * | 12/1997 | Mottier | H04M 19/04 340/7.58 |

(Continued)

FOREIGN PATENT DOCUMENTS

| | | |
|---|---|---|
| CN | 101076949 | 11/2007 |
| CN | 101421707 | 4/2009 |

(Continued)

*Primary Examiner* — Muhammad Adnan
(74) *Attorney, Agent, or Firm* — Brownstein Hyatt Farber Schreck, LLP

(57) ABSTRACT

An electronic device can output a priming cue prior to outputting an alert on the electronic device. A priming cue can be a haptic priming cue, a visual priming cue, an audio priming cue, or various combinations of these priming cues. The priming cue can be perceived by a user either consciously or subconsciously and can increase a user's perceptual state for the alert.

20 Claims, 8 Drawing Sheets

(56) References Cited

U.S. PATENT DOCUMENTS

| | | | |
|---|---|---|---|
| 5,870,684 A * | 2/1999 | Hoashi | H04M 19/04 455/73 |
| 5,877,676 A * | 3/1999 | Shankarappa | H04M 11/04 379/373.02 |
| 6,320,496 B1 | 11/2001 | Sokoler et al. | |
| 6,408,187 B1 * | 6/2002 | Merriam | H04M 19/044 455/67.7 |
| 6,426,740 B1 * | 7/2002 | Goto | A61F 4/00 345/157 |
| 6,438,393 B1 | 8/2002 | Suuronen | |
| 6,954,657 B2 | 10/2005 | Bork et al. | |
| 6,999,731 B2 * | 2/2006 | Cronin | H04M 1/72412 455/418 |
| 7,107,096 B2 * | 9/2006 | Fischell | A61B 5/349 600/509 |
| 7,136,482 B2 | 11/2006 | Wille | |
| 7,346,698 B2 | 3/2008 | Hannaway | |
| 7,375,275 B2 * | 5/2008 | Matsuoka | G10H 1/368 84/645 |
| 7,469,155 B2 * | 12/2008 | Chu | H04M 1/72463 455/567 |
| 7,599,753 B2 | 10/2009 | Taylor et al. | |
| 7,979,146 B2 * | 7/2011 | Ullrich | G06F 3/016 340/407.1 |
| 8,040,224 B2 | 10/2011 | Hwang | |
| 8,116,863 B2 | 2/2012 | Vaisnys et al. | |
| 8,144,612 B2 | 3/2012 | Johnson et al. | |
| 8,259,535 B2 | 9/2012 | Sandu et al. | |
| 8,311,236 B2 * | 11/2012 | Kanamori | H04R 3/005 381/94.1 |
| 8,441,437 B2 | 5/2013 | Rank | |
| 8,483,286 B2 | 7/2013 | Wang | |
| 8,504,114 B1 * | 8/2013 | Tseng | H04M 19/041 455/418 |
| 8,519,841 B2 | 8/2013 | Fukuyori | |
| 8,536,992 B2 | 9/2013 | Oh et al. | |
| 8,552,859 B2 * | 10/2013 | Pakula | G08B 25/016 340/540 |
| 8,612,855 B2 * | 12/2013 | Greenspan | G06F 3/01 715/702 |
| 8,690,336 B2 * | 4/2014 | Yoshikawa | G03B 21/005 353/100 |
| 8,698,639 B2 | 4/2014 | Fung et al. | |
| 8,717,151 B2 * | 5/2014 | Forutanpour | G06F 3/04847 340/407.1 |
| 8,804,467 B2 * | 8/2014 | Wang | G04G 13/023 368/263 |
| 8,955,462 B1 | 2/2015 | Golden | |
| 8,958,853 B1 * | 2/2015 | Bovis | H04W 52/0254 455/569.2 |
| 9,071,949 B2 * | 6/2015 | Mikan | H04M 3/42042 |
| 9,143,898 B1 * | 9/2015 | Barr | H04M 1/72454 |
| 9,178,509 B2 * | 11/2015 | Bernstein | H01H 13/14 |
| 9,183,731 B1 * | 11/2015 | Bokhary | H04W 4/90 |
| 9,240,021 B2 | 1/2016 | Rodriguez | |
| 9,258,667 B2 * | 2/2016 | Seshadri | H04W 4/00 |
| 9,265,458 B2 * | 2/2016 | Stack | A61B 5/162 |
| 9,288,649 B2 * | 3/2016 | Fuisz | H04W 4/02 |
| 9,307,318 B2 | 4/2016 | Anderton et al. | |
| 9,330,546 B2 | 5/2016 | Ullrich et al. | |
| 9,349,378 B2 | 5/2016 | Bharitkar et al. | |
| 9,390,599 B2 | 7/2016 | Weinberg et al. | |
| 9,443,118 B1 * | 9/2016 | Templeton | G06K 7/084 |
| 9,510,137 B2 * | 11/2016 | McCoy | H04W 4/023 |
| 9,519,898 B2 * | 12/2016 | Spencer, II | G06Q 20/341 |
| 9,552,584 B1 * | 1/2017 | Bierbaum | G06Q 20/3263 |
| 9,552,717 B1 * | 1/2017 | Rudolph | H04W 4/80 |
| 9,613,506 B2 | 4/2017 | Moussette et al. | |
| 9,672,049 B2 * | 6/2017 | Krishnamurthi | G06F 3/0488 |
| 9,674,694 B2 * | 6/2017 | Subbaramoo | H04W 12/02 |
| 9,746,945 B2 * | 8/2017 | Sheynblat | G06F 3/041 |
| 9,814,389 B2 | 11/2017 | DeHennis | |
| 9,913,033 B2 | 3/2018 | Wyatt et al. | |
| 9,972,175 B2 | 5/2018 | Heubel et al. | |
| 9,973,622 B2 * | 5/2018 | Bovis | H04M 1/72463 |
| 9,978,395 B2 * | 5/2018 | Braho | G10L 21/047 |
| 9,986,084 B2 * | 5/2018 | Abramson | H04W 4/029 |
| 9,986,405 B1 * | 5/2018 | Cardonha | H04W 4/70 |
| 10,013,058 B2 * | 7/2018 | Puskarich | H01L 41/0986 |
| 10,039,080 B2 * | 7/2018 | Miller | H04M 1/72454 |
| 10,186,138 B2 | 1/2019 | Moussette et al. | |
| 10,394,330 B2 | 8/2019 | Iwasaki et al. | |
| 2002/0010008 A1 * | 1/2002 | Bork | H04M 19/041 455/567 |
| 2005/0165321 A1 * | 7/2005 | Fischell | A61B 5/076 600/515 |
| 2005/0176384 A1 * | 8/2005 | Matsuoka | H04M 19/04 455/84 |
| 2006/0088153 A1 * | 4/2006 | Wille | H04M 19/04 379/373.01 |
| 2006/0116175 A1 * | 6/2006 | Chu | H04M 1/72463 455/567 |
| 2006/0200523 A1 * | 9/2006 | Tokuda | H04L 51/48 709/206 |
| 2007/0027397 A1 | 2/2007 | Fischell et al. | |
| 2007/0161412 A1 * | 7/2007 | Nevid | H04M 1/72427 455/567 |
| 2008/0136652 A1 * | 6/2008 | Vaisnys | A61N 1/3904 340/635 |
| 2009/0051509 A1 * | 2/2009 | Hwang | H04B 1/3888 340/407.1 |
| 2009/0166098 A1 * | 7/2009 | Sunder | G06F 3/0488 178/18.04 |
| 2010/0148942 A1 * | 6/2010 | Oh | H04M 1/72448 340/407.1 |
| 2011/0084795 A1 * | 4/2011 | Fukuyori | G06F 1/1613 340/5.1 |
| 2011/0307787 A1 * | 12/2011 | Smith | G06F 16/9566 715/727 |
| 2012/0096398 A1 * | 4/2012 | Greenspan | G06F 3/01 715/808 |
| 2012/0099594 A1 | 4/2012 | Lau et al. | |
| 2012/0212353 A1 * | 8/2012 | Fung | B60W 10/18 701/1 |
| 2012/0284012 A1 * | 11/2012 | Rodriguez | G06F 3/017 455/556.1 |
| 2012/0286943 A1 * | 11/2012 | Rothkopf | G08B 6/00 340/407.1 |
| 2013/0194177 A1 * | 8/2013 | Sakata | H04N 21/4223 345/156 |
| 2013/0202134 A1 | 8/2013 | Afshar | |
| 2014/0085077 A1 * | 3/2014 | Luna | A61B 5/0205 340/539.11 |
| 2014/0247120 A1 * | 9/2014 | Ullrich | G06F 3/016 340/407.1 |
| 2014/0292501 A1 | 10/2014 | Lim et al. | |
| 2014/0375602 A1 * | 12/2014 | Fujiune | G06F 3/016 345/174 |
| 2015/0100335 A1 * | 4/2015 | Englehard | G16H 40/63 705/2 |
| 2015/0256674 A1 * | 9/2015 | Iwasaki | G06F 1/1694 455/414.1 |
| 2015/0332564 A1 * | 11/2015 | Weinberg | H04M 1/72454 340/407.1 |
| 2017/0257844 A1 * | 9/2017 | Miller | H04M 19/047 |
| 2017/0301193 A9 * | 10/2017 | Heubel | G08B 6/00 |
| 2019/0108748 A1 | 4/2019 | Moussette et al. | |

FOREIGN PATENT DOCUMENTS

| | | |
|---|---|---|
| CN | 201583912 | 11/2009 |
| CN | 101795323 | 8/2010 |
| CN | 103179258 | 6/2013 |
| CN | 103181180 | 6/2013 |
| CN | 103534666 | 1/2014 |
| CN | 103778527 | 5/2014 |
| EP | 0973138 | 1/2000 |
| EP | 1600907 | 11/2005 |
| EP | 2375306 | 10/2011 |
| GB | 2367173 | 3/2002 |

(56) References Cited

FOREIGN PATENT DOCUMENTS

| | | |
|---|---|---|
| JP | 2005231381 | 9/2005 |
| JP | 2009015787 | 1/2009 |
| JP | 2014072558 | 4/2014 |
| JP | 2014112792 | 6/2014 |
| WO | WO 06/057770 | 6/2006 |
| WO | WO 13/152443 | 10/2013 |

* cited by examiner

PROVIDING PRIMING CUES TO A USER OF AN ELECTRONIC DEVICE

CROSS-REFERENCE TO RELATED APPLICATION

This application is a continuation of U.S. patent application Ser. No. 16/210,562, filed Dec. 5, 2018, which is a continuation of U.S. patent application Ser. No. 14/562,465, filed Dec. 5, 2014, now U.S. Pat. No. 10,186,138, which is a nonprovisional of and claims the benefit under 35 U.S.C. § 119(e) of U.S. Provisional Patent Application No. 62/044,982, filed Sep. 2, 2014, entitled the contents of which are incorporated herein by reference.

TECHNICAL FIELD

The present invention relates to providing alerts to users of electronic devices, and more particularly to priming an alert.

BACKGROUND

Electronic devices have become ubiquitous in people's daily lives. Certain electronic devices such as cell phones, tablet computing devices, personal digital assistants, and the like have become common items in the workplace and at home. Some of these electronic devices include an ability to notify or alert a user to a particular item of interest, such as, for example, an incoming email or text message. However, in some situations, an alert may be inadvertently ignored by the user. The user's perception system may not detect the alert at all, or may be slow to detect the alert.

SUMMARY

An electronic device can output one or more priming cues prior to outputting one or more alerts on the electronic device. A priming cue can be a haptic priming cue, a visual priming cue, an audio priming cue, or various combinations of these priming cues. The priming cue can be perceived by a user either consciously or subconsciously, and may subliminally or unconsciously increase the awareness of the user without specifically attracting the user's attention to the priming cue. The priming cue can heighten the awareness of the user or place the user in a more receptive state for perceiving the alert. In some situations, the priming cue can decrease a user's reaction time for perceiving the alert. The priming cue may be imperceptible or barely perceptible for the entire duration of the priming cue in some embodiments. In other embodiments, the priming cue may be imperceptible or barely perceptible for a portion of the duration and perceptible for the remaining portion of the duration.

The stimulus that constitutes the priming cue may be uniform during the duration of the priming cue; can vary over the duration of the priming cue; or can vary for only a portion of the duration of the priming cue. As one example, the stimulus can vary (e.g., increase) over time. For example, the frequency, intensity, and/or the rhythm can vary during the duration. Additionally or alternatively, the stimulus can pulse (increase and decrease in intensity) during some or all of the duration. Additionally or alternatively, the priming cue can mimic known patterns, sounds, or representations (e.g., image). As one example, the priming cue can mimic a heartbeat. In some embodiments, the variance in the stimulus may be noticeable by the user.

In one aspect, a method for priming an alert on an electronic device can include detecting an action that is associated with the alert and determining whether a priming cue is to be produced for the alert based on one or more factors. If a priming cue is to be produced, the priming cue for the alert is output on the electronic device. The alert is then output on the electronic device, where the alert is offset in time from the priming cue by a period of time. The one or more factors can include, but are not limited to, the type of alert to be output, one or more environmental conditions, and/or the motion (or lack thereof) of the electronic device.

The period of time can be fixed for each priming cue, or the period of time can vary depending on one or more characteristics of the priming cue and/or of the alert. For example, the type of priming cue and/or the alert (e.g., haptic, audio, visual), the intensity of the priming cue and/or of alert, and/or the duration of the priming cue and/or of the alert can influence the amount of time that exists between the priming cue and the alert.

In another aspect, a method for priming a user for the receipt of an alert in an electronic device can include providing a priming cue to the user on the electronic device, and determining whether a user has responded to the priming cue. If the user responds to the priming cue, an alert may be provided to the user on the electronic device. In some embodiments, a stimulus of the priming cue can be modified if the user does not respond to the priming cue. In some embodiments, a determination may also be made as to whether or not a user responds to the alert. If the user does not respond to the alert, one or more characteristics of the alert may be modified. For example, an intensity and/or a duration of a priming cue may be modified if the user does not respond to the priming cue. Similarly, an intensity and/or a duration of an alert may be modified if the user does not respond to the alert.

In yet another aspect, an electronic device can include a priming and alert system, an input/output device operably connected to the priming and alert system, and a processing device operably connected to the priming and alert system and adapted to cause the priming and alert system to provide a priming cue to a user. The priming and alert system can include a haptic module, an audio module, and/or a visual module. The processing device may also be adapted to cause the priming and alert system to provide an alert to the user after the priming cue is provided to the user.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Figure 1:
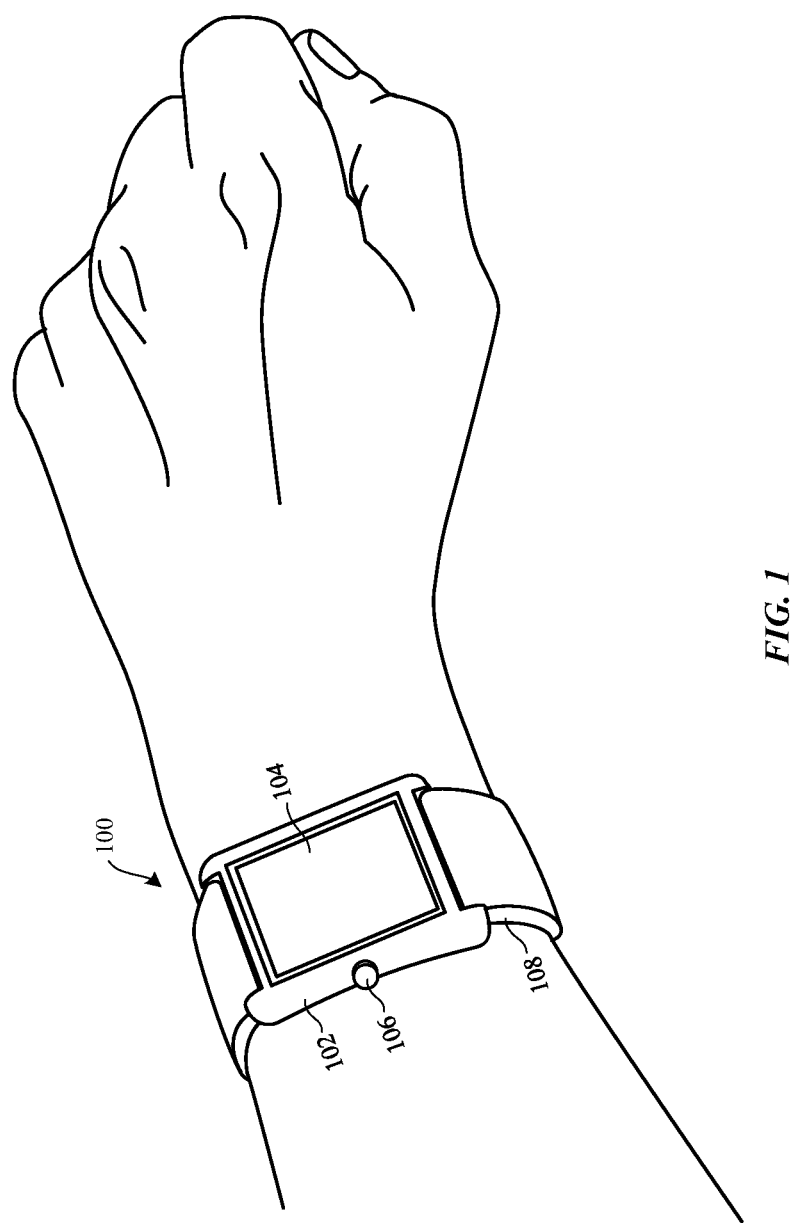
FIG. 1 is a perspective view of one example of an electronic device that can produce a priming cue prior to outputting an alert.

An electronic device can present one or more alerts to a user based on the detection of an event or action. For example, a user can be alerted to the receipt of an email or text, or of an impending meeting or appointment scheduled in a calendar program. Each alert may define a distinct alert that may include multiple elements that provide different types of stimuli to the user. For example, an alert may define an audio alert, a visual alert, a haptic alert, or various combinations of these alerts. The combinations of alerts can occur concurrently, consecutively, or with some overlap in time.

Alerts by themselves, however, are not always noticed by a user. The environment may be distracting or the user may be otherwise distracted. Further, in some situations it may be useful to emit an alert at a low power, which may cause the perceptibility of the alert to be diminished. This may be useful when the battery has a low charge and a tradeoff may be made between the alert strength and charge conservation, for example.

Thus, certain embodiments may preface an alert with a priming cue. The priming cue may be an output that is minimally perceptible or subconsciously perceptible by a user of an electronic device. In one embodiment, the priming cue is of a mode different than that of the alert itself. For example, the priming cue may be a haptic output while the alert is an audio output. In such an example, the haptic output of the priming cue may be designed to cause sufficiently small motions in the electronic device that the user may be placed in a state of heightened awareness without being explicitly aware of the priming cue. The user, while in this state, may be more receptive to the alert and therefore may notice it more quickly (or at all). As another example, the priming cue may take the form of a light or graphic flashing on a display at a rate too fast to be consciously perceived by the human eye, but subconsciously registered, thereby drawing the user's attention to the device and priming the user to receive the alert.

In other embodiments, the priming cue is the same mode as that of the alert or of components of the alert. For example, a priming cue and an alert may both be haptic outputs. Alternatively, a priming cue may be an audio output, while an alert is a composition of an audio output and a visual output.

In certain embodiments the priming cue may be generated only when the device determines a priming cue is to be output, instead of before every alert. The electronic device may determine any or all of the last time at which a user interacted with the electronic device, the current activity and/or operational state of the electronic device, the user's current action, the presence or absence of environmental factors such as noise, bright light, and so on, and use these to intelligently determine if a priming cue should be output, if so, the strength of the priming cue.

As discussed above, embodiments described herein provide one or more priming cues to a user prior to issuing an alert. Each priming cue can take the form of a stimulus that is delivered as a haptic priming cue, a visual priming cue, an audio priming cue, or various combinations of these priming cues. The priming cue can be perceived by the user either consciously or subconsciously. A priming cue can prepare the user to perceive the stimulus of the alert, and in some situations, the priming cue may reduce a user's reaction time for perceiving the alert. In some embodiments, the priming cue may not be noticeable by the user, but instead causes the user to be in a state of heightened awareness that makes the user more likely to perceive an alert that exceeds a perceptual threshold (e.g., is sufficiently loud, bright, forceful, stirring, and so on).

Generally, the stimulus that constitutes the priming cue may be uniform during the duration of the priming cue; can vary over the duration of the priming cue; or can vary for only a portion of the duration of the priming cue. As one example, the stimulus can vary over time. For example, the frequency, intensity, and/or the rhythm can vary during the duration. Additionally or alternatively, the stimulus can pulse (increase and decrease in intensity) during some or all of the duration. Additionally or alternatively, the priming cue can mimic known patterns, sounds, or representations (e.g., image). As one example, the priming cue can mimic a heartbeat. In some cases, a variable priming cue may be output by the electronic device until input is received from the user. For example, the user may touch the screen of the electronic device or provide another form of input that is received by the electronic device. In response to receiving the input, the electronic device may output an alert or an alert that is uniform or varies over some or all of the duration of the alert.

In some embodiments, an electronic device can detect the presence of other electronic devices that are located within a given distance of the electronic device. A priming cue can be provided to the multiple electronic devices at substantially the same time. As one example, a group of users may be in a meeting and a subset of the users may receive a priming cue and an alert for the same reason and at substantially the same time.

A third party may activate a priming cue in some embodiments. The third party may select the type of priming cue (e.g., haptic, audio, visual, or combinations thereof) to be provided to the user. Alternatively, the type of priming cue that is presented to the user can be based on how the user has configured his or her electronic device (e.g., with a preferences menu). As one example, the Emergency Alert System may trigger a priming cue and alert in the event of a national or regional emergency. Alternatively, a restaurant may trigger a priming cue and alert to inform a user that a table is available for the user. As another example, a transportation system, such as an airline or light rail system can trigger a priming cue and alert to inform a user that a plane is boarding or a light rail train is arriving or departing from a station.

The implementations described above may be implemented on an electronic device that is configured to produce one or more forms of output to the user. FIG. 1 is a perspective view of one example of an electronic device that can output a priming cue prior to providing an alert to a user. In the illustrated embodiment, the electronic device 100 is implemented as a wearable communication device. The wearable communication device may be configured to provide, for example, wireless electronic communication from other devices and/or health-related information or data such as but not limited heart rate data, blood pressure data, temperature data, oxygen level data, diet/nutrition information, medical reminders, health-related tips or information, or other health-related data.

Other embodiments can implement the electronic device differently. For example, the electronic device can be a smart telephone, a gaming device, a digital music player, a tablet computing device, and other types of portable and consumer electronic devices that provide alerts to a user.

The electronic device 100 includes an enclosure 102 at least partially surrounding a display 104 and one or more buttons 106 or input devices. The enclosure 102 can form an outer surface or partial outer surface and protective case for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 can be implemented with any suitable technology, including, but not limited to, a multi-touch sensing touch screen that uses liquid crystal display (LCD) technology, light emitting diode (LED) technology, organic light-emitting display (OLED) technology, organic electroluminescence (OEL) technology, or another type of display technology.

The button 106 can take the form of a home button, which may be a mechanical button, a soft button (e.g., a button that does not physically move but still accepts inputs), an icon or image on a display or on an input region, and so on. Additionally or alternatively, the button 106 can be an input/output device that allows the user to interact with one or more functions and/or applications in the wearable communication device 100. Other mechanisms may be used as input/output devices, such as a speaker, a microphone, an on/off button, a mute button, or a sleep button. In some embodiments, the button 106 can be integrated as part of a cover glass of the electronic device.

The electronic device 100 can be permanently or removably attached to a band 108. The band 108 can be made of any suitable material, including, but not limited to, leather, metal, rubber or silicon, fabric, and ceramic. In the illustrated embodiment, the band is a wristband that wraps around the user's wrist. The wristband can include an attachment mechanism (not shown), such as a bracelet clasp, Velcro, and magnetic connectors. In other embodiments, the band can be elastic or stretchy such that it fits over the hand of the user and does not include an attachment mechanism.

Figure 2:
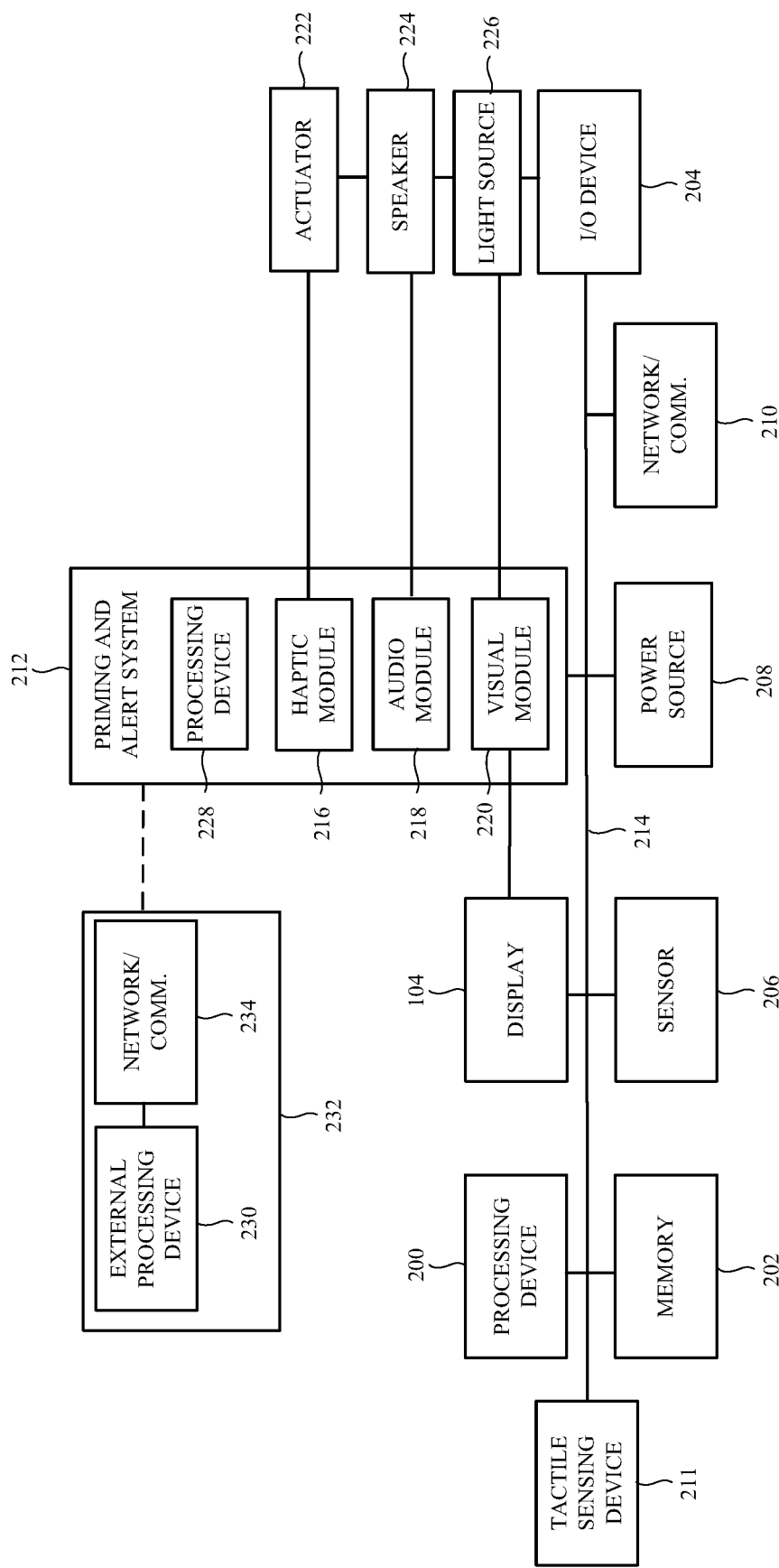
FIG. 2 is an illustrative block diagram of the electronic device 100 shown in FIG. 1.

FIG. 2 is an illustrative block diagram of the electronic device 100 shown in FIG. 1. The electronic device 100 can include the display 104, one or more processing devices 200, memory 202, one or more input/output (I/O) devices 204, one or more sensors 206, a power source 208, a network communications interface 210, tactile sensing device 211, and a priming and alert system 212. The display 104 may provide an image or video output for the electronic device 100. The electronic device may also have an input surface for one or more input devices, such as, for example, a touch sensing device and/or a fingerprint sensor. The display 104 may be substantially any size and may be positioned substantially anywhere on the electronic device 100.

The processing device 200 can control some or all of the operations of the electronic device 100. The processing device 200 can communicate, either directly or indirectly with substantially all of the components of the electronic device 100. For example, a system bus or signal line 214 or other communication mechanisms can provide communication between the processing device(s) 200, the memory 202, the I/O device(s) 204, the sensor(s) 206, the power source 208, the network communications interface 210, the tactile sensing device 211, and/or the priming and alert system 212. The one or more processing devices 200 can be implemented as any electronic device capable of processing, receiving, or transmitting data or instructions. For example, the processing device(s) 200 can each be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 202 can store electronic data that can be used by the electronic device 100. For example, a memory can store electrical data or content such as, for example, audio and video files, documents and applications, device settings and user preferences, timing and control signals or data for the priming and alert system 212, data structures or databases, and so on. The memory 202 may also store application programs that may be executed by the processing device(s) 200. Example application programs include, but are not limited to, phone programs, e-mail programs, personal information management (PIM) programs, word processing programs, spreadsheet programs, Internet browser programs, messaging programs, and the like. The memory 202 can be configured as any type of memory. By way of example only, the memory can be implemented as random access memory, read-only memory, Flash memory, removable memory, or other types of storage elements, or combinations of such devices.

The one or more I/O devices 204 can transmit and/or receive data to and from a user or another electronic device. One example of an I/O device is button 106 in FIG. 1. The I/O device(s) 204 can include the display 104, a touch sensing input surface such as a track pad, one or more buttons, one or more microphones or speakers, one or more actuators, one or more ports such as a microphone port, and/or a keyboard.

The electronic device 100 may also include one or more sensors 206 positioned substantially anywhere on the electronic device 100. The sensor or sensors 206 may be configured to sense substantially any type of characteristic, such as but not limited to, images, pressure, light, touch, heat, position, motion, and so on. For example, the sensor(s) 206 may be an image sensor, a heat sensor, a light or optical sensor, a pressure transducer, a magnet, a gyroscope, an accelerometer, and so on.

The power source 208 can be implemented with any device capable of providing energy to the electronic device 100. For example, the power source 208 can be one or more batteries or rechargeable batteries, or a connection cable that connects the remote control device to another power source such as a wall outlet. Additionally or alternatively, the power source 208 may be a wireless energy transfer system, such as an inductive energy transfer system, that provides power to the electronic device to recharge the batteries or to operate the electronic device.

The network communication interface 210 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

The tactile sensing device 211 is configured to receive tactile input from a user, such as, for example, one or more touch and/or force inputs. As described earlier, the display 104 can be a multi-touch sensing touchscreen. Additionally or alternatively, a tactile sensing device 211 may be a fingerprint sensing that captures fingerprint data from a user of the electronic device. In some embodiments, the tactile sensing device 211, or components of a tactile sensing device, can be integrated into one or more other components of the electronic device 100. As one example, a fingerprint sensing device may be included in at least a portion of the display 104. As another example, a tactile sensing device can be a touch sensing input surface of a track pad or other I/O device 204.

The priming and alert system 212 can be adapted to provide priming cues and alerts via a haptic module 216, an audio module 218, and/or a visual module 220. A "module," as used herein, may be a hardware, firmware, or software component with particular functionality, operations, and/or output. It should be appreciated that certain modules may be combined with one another or otherwise integrated together. The haptic module 216 can include an element that produces haptic feedback and the haptic module 216 is configured to produce a signal that is received by the element that produces haptic feedback. In the illustrated embodiment, the haptic module 216 includes one or more actuators 222 that receive signals from the haptic module 216. The actuator(s) 222 produce haptic feedback (e.g., vibrations) based on the signals received from the haptic module 216. The actuator(s) generate the haptic feedback as part of an I/O device 204 (e.g., a surface of the enclosure 102 or the band 108 in FIG. 1). The actuator(s) can move in one direction or multiple directions to provide a haptic priming cue to the user. For example, an actuator can translate in a horizontal direction (e.g., translate in parallel with or across the width of the user's wrist) and output one or more taps or vibrations that the user senses either consciously or subconsciously. The one or more actuators 222 may be configured as any suitable actuator. As a non-limiting example, an actuator 222 can be a linear electromagnetic actuator.

The audio module 218 is configured to produce audible priming cues and alerts. The audio module 218 can produce a signal that is received by an element that produces an audio output. In the illustrated embodiment, the audio module 218 includes a speaker 224 that receives signals from the audio module 218 and generates an audio output based on the received signals. Example audio outputs include, but are not limited to, a tone and a musical composition.

The visual module 220 may be used to provide visual priming cues and alerts to a user of the electronic device. In the illustrated embodiment, visual module 220 can include a light source 226 that receives signals from the visual module 220 and generates a visual output based on the received signals. Thus, the light source 226 may be part of the I/O device 204. Any suitable type of light source may be used. As one example, the light source can be one or more light emitting diodes.

Additionally or alternatively, the visual module 220 can transmit signals to the display 104 that cause the display to generate a visual output based on the received signals. As one example, the visual priming cue may be output by the display around only the periphery or edges of the display, or along a subset of the edges (e.g., one or two) of the display.

A processing device 228 may be included in the priming and alert system 212. The processing device 228 may be any suitable type of processing device. The processing device 228 can provide the signals for each module 216, 218, 220 in the priming and alert system 212. In one embodiment, the signals for the actuator 222, the speaker 224, and the display 104 can be stored in memory 202 and accessed by the processing device 228.

In another embodiment, the processing device 228 is not included in the priming and alert system 212 and the processing device 200 provides signals to the modules 216, 218, 220. Additionally or alternatively, the processing devices 200 and 228 can control and provide signals to the modules 216, 218, 220 by combined or distributed processing.

In some embodiments, a processing device 230 in an external device 232 can cause the priming and alert system 212 to present a priming cue and/or an alert to a user. The processing device 230 can transmit a signal to the electronic device 100 using, for example, a network/comm. interface 234 (e.g., Wi-Fi, cellular, Bluetooth) operably connected to the processing device 230. As is described in more detail later, a processing device operated by a third party, such as a restaurant or a public transportation system, may trigger the priming and alert system 212 to present a priming cue and/or an alert to a user.

Accordingly, alerts may be generated: upon receipt of data by the device from an external source (text messages, emails, phone calls, warning systems, and the like); by an application (for example, to indicate that a user input is requested); upon reaching a certain time (for example, a time at which a calendar entry occurs); by an operational state of the electronic device (for example, a low battery charge, an upgrade to the operating system of the device, the device temperature reaching a certain point, and so on); through a user-initiated setting (an alarm set to occur at a certain time); due to geographic factors (entering or exiting a certain area); proximity (as another person with another electronic device is nearby); and so on. These and other alert conditions will be appreciated upon reading this document in its entirety.

Figure 3:
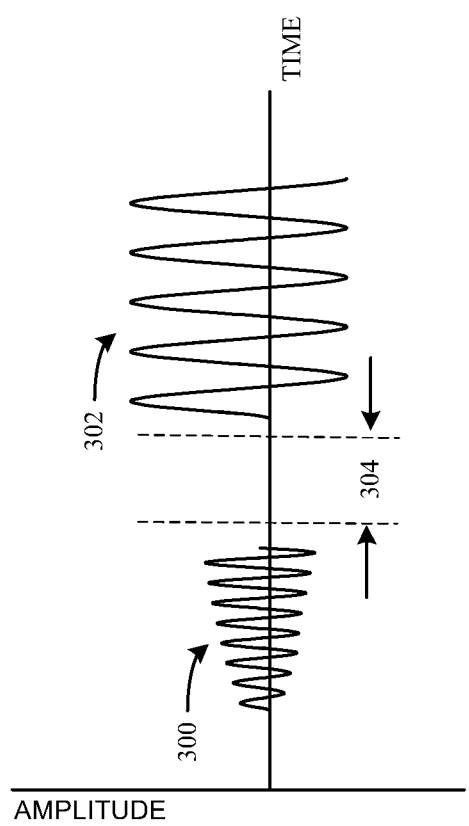
FIG. 3 illustrates a sample output from a sample electronic device, including both a priming cue and an alert waveform.

FIG. 3 illustrates a sample output from a sample electronic device, including both a priming cue 300 and an alert waveform 302. As shown, the amplitude of the priming cue 300 may be substantially lower than that of the alert 302, since the priming cue is not designed to actually draw the user's attention to an outputting electronic device but instead of place the user in a state of heightened or subliminal awareness. Additionally, the illustrated priming cue 300 increases in amplitude over time. The maximum amplitude of the priming cue 300, however, remains below the amplitude(s) of the alert 302. In other embodiments, the priming cue 300 can be constant over time. Thus, as previously mentioned, the priming cue facilitates the user's awareness of the alert when the alert actually occurs.

Additionally or alternatively, the amplitude of the alert 302 can vary over time or have a constant amplitude. The alert 302 shown in FIG. 3 increases to a maximum second amplitude from a first amplitude. Other embodiments can gradually increase the amplitude over the entire time the alert is output. Alternatively, the amplitude of the alert can remain constant. The constant amplitude may be the maximum amplitude or an amplitude that is less than the maximum amplitude.

As also shown in FIG. 3, a time delay 304 may separate the priming cue 300 and the alert waveform 302. The delay 304 may cause an anticipatory reaction in the user insofar as the priming cue has ended but no other action has occurred. Further, the delay 304 ensures that the priming cue and the alert do not meld into one another. It should be appreciated that the timing delay is entirely optional and may be omitted in some embodiments.

In some embodiments, the time delay 304 can permit an element that produced a priming cue to return to a nominal or settled state before the same element is used to generate an alert. As one example, a priming cue waveform can be received by an actuator to output a priming cue. The time delay allows the actuator to return to a settled state before the actuator receives an alert waveform. Allowing the actuator to return to the settled state ensures the moving component in the actuator does not move in an unpredictable or undesirable manner.

Figure 4:
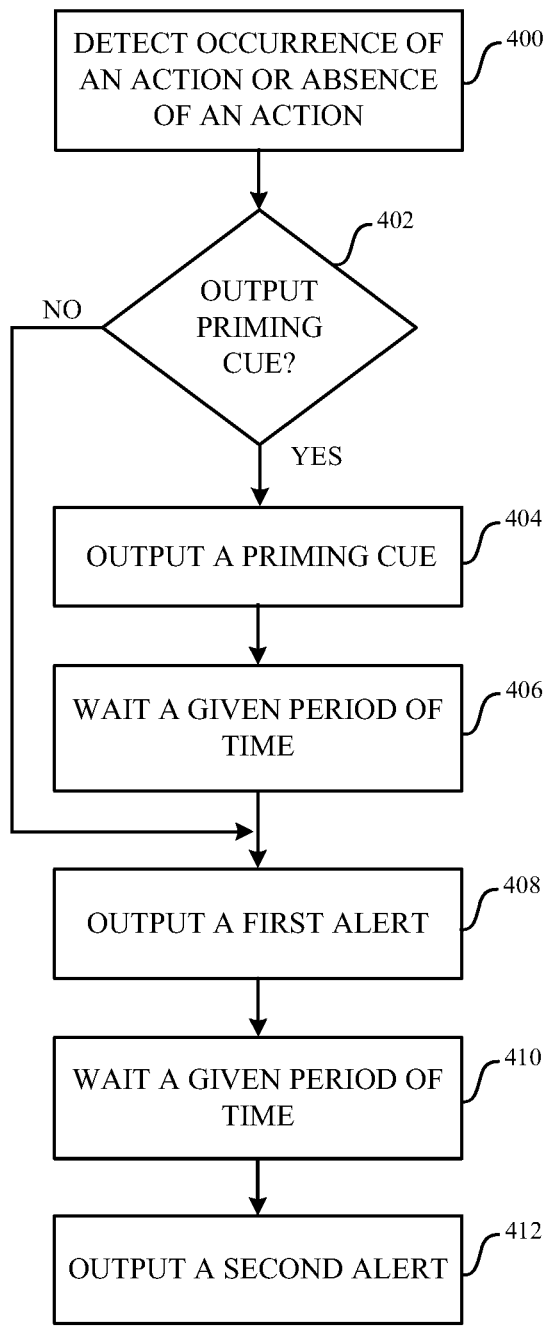
FIG. 4 is a flowchart of a first method of outputting a priming cue prior to an alert being produced in an electronic device.

Referring now to FIG. 4, there is shown a flowchart of a first method of outputting a priming cue prior to the production of an alert. Initially, as shown in block 400, the electronic device detects the occurrence of an action that is associated with, or produces an alert that is presented to a user. As one example, the action may be the receipt of an email or text message. As another example, the action may be a reminder for a calendar entry.

A determination may then be made at block 402 as to whether or not a priming cue is to be output based on the detected occurrence or non-occurrence of an action. In some embodiments, an electronic device can detect certain factors and determine whether or not to present a priming cue to a user based on the factors. As one example, an electronic device may detect a user has not interacted with the electronic device within a given period of time. For example, a user may not have provided an input on a touch screen for a given period of time, may not have provided a voice command to the device recently, or may have provided (or not) some other type of input within a period. Alternatively, one or more sensors associated with the electronic device (e.g., sensors 206 in FIG. 2) may not have produced an output that indicates the electronic device has moved within the given period of time. As yet another option, the device may determine aspects of an environment through environmental sensors and use that data to determine whether or not a priming cue would facilitate perception of the alert. For example, in a dark environment, there may be no need for a priming cue to precede a visual alert because the impact of the visual alert will be magnified under the circumstances. The same is true with respect to an audio alert in a quiet environment. Conversely, some environmental factors (e.g., noise, light) may increase the likelihood that the device will initiate a priming cue.

In some embodiments, a motion sensor may be used to determine if a user is walking, running, or engaging in physical activity. If so, the device may be more likely to initiate a priming cue, as the user is occupied in activities that occupy some significant portion of his or her attention. Certain embodiments may employ biometric sensors, such as PPG sensors, to track a user's heart rate in order to determine how strenuous an activity is and use that data to modify the strength of a priming cue. Likewise, a device sensor may measure skin conductance to determine how close the device is to the user's skin; higher values may indicate a looser connection and/or greater distance between device and skin. Again, such data may be used to determine whether or not to initiate a priming cue and to determine the strength thereof. The motion sensor may likewise be used to determine a user's engagement with the electronic device, for example, whether the user has picked up the device recently or is holding the device in a position that indicates the user is looking at the device. In such cases, the device may decide not to generate a priming cue or to mitigate the strength of the priming cue.

If a determination is made at block 402 that a priming cue is to be output, the priming cue is generated at block 404. The priming cue may take the form of one or more stimuli that is presented to the user. For example, a stimulus in the form of a haptic priming cue may be provided to the user. The haptic priming cue may be more personal and private in some situations compared to a visual or audio priming cue. An audio priming cue and/or a visual priming cue can be produced at block 404 instead of, or in addition to, a haptic priming cue.

As described earlier, the priming cue can be perceived by a user either consciously or subconsciously, and may subliminally or unconsciously increase the sensitivity of the user without specifically attracting the user's attention to the priming cue. The priming cue can heighten the awareness of the user or place the user in a more sensitive or receptive state for perceiving the alert. The priming cue may be imperceptible or barely perceptible for the entire duration of the priming cue in one embodiment. In another embodiment, the priming cue may be imperceptible or barely perceptible for a portion of the duration and perceptible for the remaining portion of the duration. And in yet another embodiment, the priming cue may be perceptible for the duration of the priming cue.

A given first period of time can then pass at block 406. The priming cue may end prior to block 406, or the priming cue can continue during some or all of the wait period. Any suitable amount of time can be used in block 406. In some embodiments, the amount of time is fixed for each priming cue. In other embodiments, the amount of time can vary depending on one or more characteristics of the priming cue. For example, the type of priming cue (e.g., haptic, audio, or visual), the duration of the priming cue, and/or the intensity of the stimulus of the priming cue can influence the amount of time in block 406. A lesser amount of time can pass in block 406 when the intensity of the stimulus is strong or greater. Conversely, a greater amount of time can pass in block 406 when the intensity of the stimulus is weaker. As another example, a lesser amount of time can pass in block 406 when the duration of the stimulus for the priming cue is greater, while a greater amount of time can pass when the duration of the stimulus is longer.

Additionally or alternatively, the amount of time in block 406 can vary depending on one or more characteristics of the first alert to be produced. For example, the type of alert (e.g., haptic, visual, or audio), the duration, and/or the intensity of the alert stimulus can influence the amount of time in block 406. A lesser amount of time can pass in block 406 when the intensity of the stimulus is weaker. Conversely, a greater amount of time can pass in block 406 when the intensity of the stimulus is greater. As another example, a lesser amount of time can pass in block 406 when the duration of the stimulus for the alert is greater, while a greater amount of time can pass when the duration of the stimulus is longer.

If a priming cue will not be output at block 402, or after the given amount of time has passed at block 406, the alert is produced at block 408. The first alert that is output to the user in block 408 can have the same modality or a different modality as the priming cue, or modalities of portions of the alert and priming cue can be the same. As one example, the priming cue and the alert have the same modality if a haptic priming cue is provided at block 404 and a haptic alert is produced at block 408. As another example, the priming cue and the alert are different modalities if a haptic priming cue is presented at block 404 and an audio alert is provided at block 408. As another example, modalities of portions of the priming cue and alert can be the same if a haptic priming cue is presented at block 404 and an audio and haptic alert is provided at block 408.

A given second period of time can pass at block 410 before a second alert is output to the user (block 412). The second period of time can be fixed or variable, and may be the same amount of time or a different amount of time as the first period of time in block 406. One or more characteristics of the first alert and/or of the second alert can influence the amount of time that passes at block 410. For example, the stimulus type (e.g., haptic or audio), the intensity of the stimulus, and/or the duration of the stimulus of the first and/or second alert can influence the amount of time in the second time period.

In some embodiments, for select second alerts the second period of time can be zero and the second alert is combined with the first alert to form a composition. In other words, the two alerts can be synchronized with the second alert output to the user immediately after the first alert. As one example, an audio alert can be provided to a user immediately after a haptic alert. The select second alerts can be selected based on one or more characteristics of the first alert. For example, the stimulus type (e.g., haptic or audio), the intensity of the stimulus, and/or the duration of the stimulus of the first alert can influence the amount of time in the second given period of time in block 410. In some embodiments, the second alerts can be selected based at least in part on the alert conditions. Different types of alerts have different alert conditions. As one example, a second period of time can follow a haptic alert that is produced with an increased or high intensity to permit the moving component of the actuator to settle before the actuator produces a second alert.

Additionally or alternatively, the second alert may be presented to the user substantially simultaneously with the first alert, or the second alert can be presented with some overlap in time with the first alert.

One or more characteristics of the first alert can also influence a characteristic or characteristics of the second alert provided to the user at block 412. For example, the stimulus type (e.g., haptic or audio), the intensity of the stimulus, and/or the duration of the stimulus of the first alert can influence the stimulus type, the intensity of the stimulus, and/or the duration of the stimulus of the second alert. In some embodiments, a second alert may not be presented to the user. For example, a second alert may not be provided to the user for select first alerts. Alternatively, an electronic device can be configured to not provide a second alert to a user. As another example, the second alert may or may not be preceded by its own priming cue; the electronic device may employ the same parameters and analysis as described elsewhere herein to determine whether a second alert is preceded by a second priming cue (in the event the first and second alerts are not simultaneously presented).

In some embodiments, more than two alerts can be output to a user. Each alert can be separated by a period of time, or some alerts may be presented to a user as a composition without any time breaks between the alerts (e.g., the alerts may be provided concurrently, consecutively, or with some overlap in time). In some embodiments, a second priming cue may be presented to the user after a certain number of alerts have been produced. Adding a priming cue after a certain number of alerts can reduce the likelihood that a user will develop "alert fatigue", where the alerts become annoying or irritating to the user.

Figure 5:
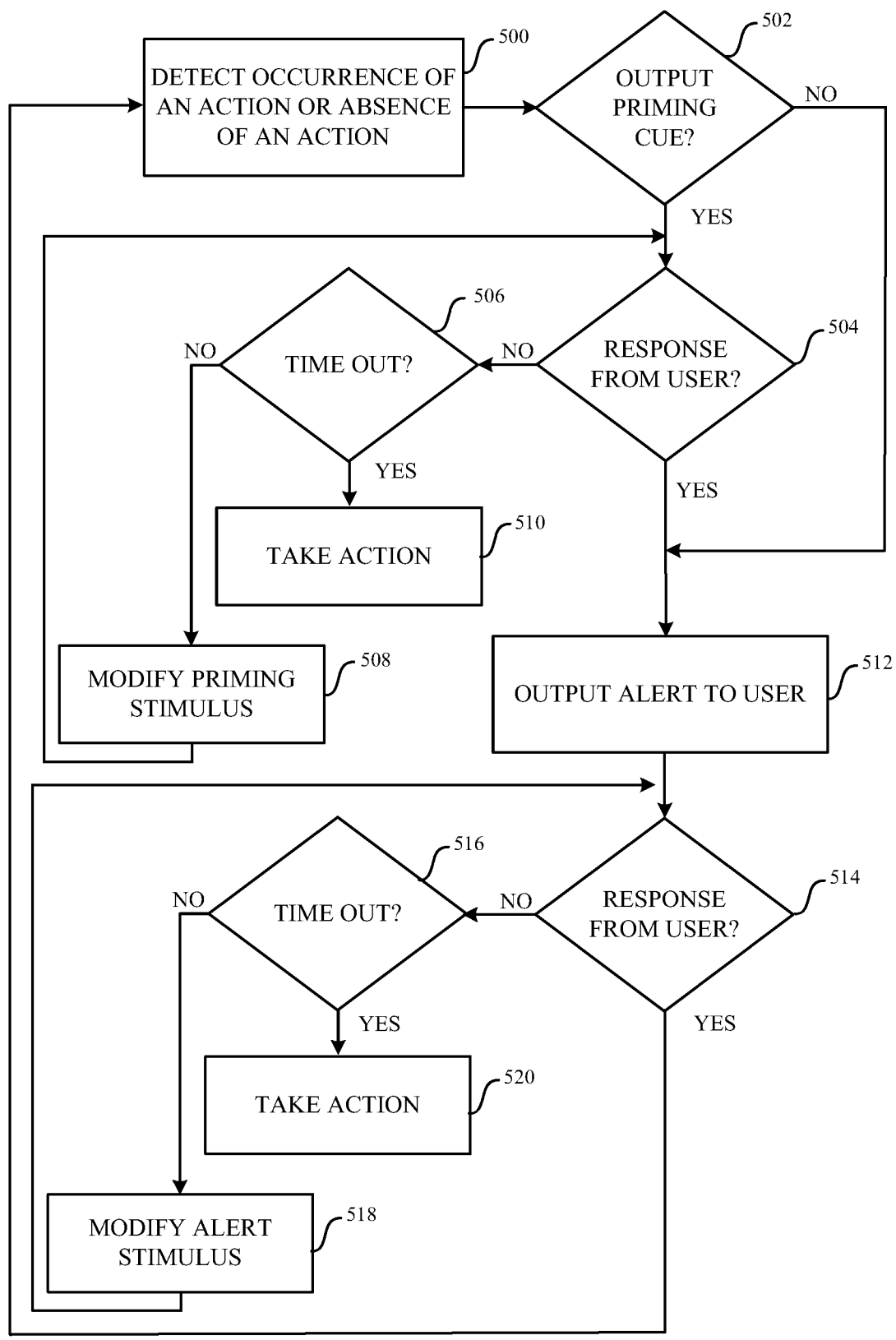
FIG. 5 is a flowchart of a second method of outputting a priming cue before an alert is produced in an electronic device.

FIG. 5 is a flowchart of a second method of outputting a priming cue before an alert is produced in an electronic device. Initially, the electronic device may detect at block 500 the occurrence of an action that is associated with, or produces an alert. Alternatively, the electronic device can detect the absence of an action at block 500. A determination may then be made at block 502 as to whether or not a priming cue is to be output to a user. If so, a priming cue is output to a user at block 502.

A determination may be made at block 504 as to whether or not a user has responded to the priming cue. As one example, a user can touch a touch screen or a given area of an enclosure of the electronic device to respond to the priming cue. Alternatively, a user can perform a gesture to respond to the priming cue. As another example, an image sensor in the electronic device can be used to monitor the user's gaze. A priming cue may be output, for example, if the user has not looked at the electronic device over a given period of time. Alternatively, a motion sensor (e.g., gyroscope, accelerometer, magnetometer, etc.) can detect the absence of motion for the electronic device over a given period of time, and a priming cue can be generated if the electronic device has not moved during the given period of time.

If a response is not received from the user at block 504, the process passes to block 506 where a determination is made as to whether or not a time period for providing a priming cue to the user has expired. If not, at least one characteristic of the stimulus of the priming cue can be modified at block 508 and the method returns to block 504. For example, the type of stimulus can be changed and/or the duration of the stimulus can be increased at block 508

If the time period for providing a priming cue to the user has ended, the electronic device can take an action at block 510. For example, the electronic device can wait for a given amount of time and then re-present the same priming cue or a different priming cue. Alternatively, the electronic device may determine the user is not able to perceive the priming cue or is not wearing the electronic device based an output received from one or more sensors in the electronic device. As one example, the output from the one or more sensors may be used to determine or estimate a noise level and/or a light level of the environmental conditions associated with the electronic device. Based on the noise level and/or the light level, the electronic device may determine the user is unable to perceive the priming cue and may stop presenting the priming cue to the user.

Additionally or alternatively, the output from one or more sensors can be used to determine a motion level of the electronic device. Based on the motion level (e.g., no motion for a given period of time), the electronic device may determine the user is not wearing the electronic device. Alternatively, if the motion level is high (e.g., the user is exercising), the electronic device can determine the user is not able to perceive the priming cue and may stop outputting the priming cue. As another example, the processing device in the electronic device can detect the battery is being charged using, for example, a power cord or a wireless energy transfer system, and determine the user is not wearing the electronic device.

Returning to blocks 502 and 504, if a priming cue will not be output at block 502, or if a response is received based on the priming cue at block 404, the process continues at block 512 where an alert is output to the user. The alert can be a single alert (e.g., a haptic alert) or a combination of alerts that form a composition. The combination of alerts may have the same or different modalities and may or may not be separated by a period of time.

A determination may then be made at block 514 as to whether or not the user has responded to the alert. If not, the process passes to block 516 where a determination is made as to whether or not a time period for providing the alert to the user has expired. If not, one or more characteristics of the stimulus of the alert can be modified at block 518 and the method returns to block 514. For example, the type of stimulus can be changed and/or the duration of the stimulus can be increased at block 518.

If the time period for providing an alert has ended, the electronic device can take an action at block 520. Similar to the priming cue, the electronic device can wait for a given amount of time and then re-present the same or a different alert. Alternatively, the electronic device may determine the user is not able to perceive the alert or is not wearing the electronic device based an output received from one or more sensors in the electronic device. Additionally or alternatively, the output from one or more sensors can be used to determine a motion level of the electronic device, and based on the motion level, the electronic device may determine the user is not wearing the electronic device or is not able to perceive the alert.

Figure 6:
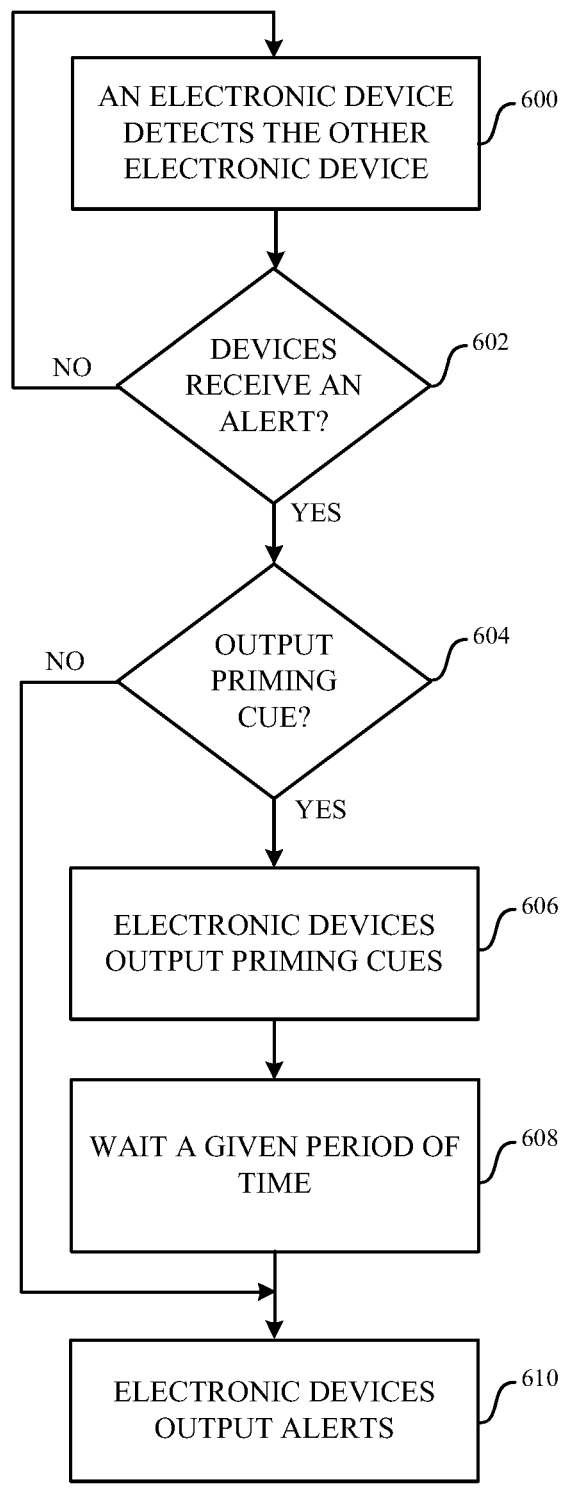
FIG. 6 is a flowchart of a method of outputting a priming cue to a group of users prior to an alert to be received on their electronic devices.

Referring now to FIG. 6, there is shown a method of outputting a priming cue to a group of users prior to an alert to be received on their electronic devices. In some embodiments, a priming cue and an alert may be sent to the group of users for the same reason and at substantially the same time. Initially, as shown in block 600, an electronic device detects the presence of one or more other electronic devices located within a given distance from the electronic device. The electronic device that detects the presence of the other electronic devices may be an electronic device of one of the users in the group of users, or a separate electronic device that is in communication with the electronic devices in the group of users. As one example, an electronic device can detect another electronic device using a network communication interface (e.g., network communication interface 210 in FIG. 2) such as Bluetooth.

A determination may then be made at block 602 as to whether or not an alert is to be received by two or more of the electronic devices. If so, a determination can be made at block 604 as to whether or not a priming cue is to be output by the electronic devices. If so, a priming cue is output by the electronic devices at block 606 based on an impending event or action. Each electronic device can produce the same type of priming cue or one or more electronic devices can output different priming cues. The type of priming cue output by an electronic device may be based on how a user has configured the electronic device (e.g., through a preferences menu). As described previously, the priming cues can direct or focus the user's attention and prepare the users to perceive, either consciously or subconsciously, the stimulus of a later received alert. The priming cues may decrease the user's reaction time for perceiving the subsequent alert.

A first given period of time can pass at block 608 before an alert is output by the electronic devices at block 610. Again, the same amount of time can pass for each user or a different amount of time can be used at block 608 for one or more users. The amount of time that passes in block 608 can be based on the type of stimulus for the alert and/or how a user has configured his or her electronic device (e.g., through a preferences menu).

Any suitable amount of time can be used in block 608. In some embodiments, the amount of time is fixed for each priming cue. In other embodiments, the amount of time can vary depending on one or more characteristics of the priming cue and/or of the alert to be output by the electronic devices. For example, the stimulus strength of the priming cue can influence the amount of time in block 608. A lesser amount of time can pass in block 608 when the intensity of the stimulus is strong or greater. As another example, a lesser amount of time can pass in block 608 when the duration of the stimulus for the priming cue is greater, while a greater amount of time can pass when the duration of the stimulus is longer.

The alert that is output in block 610 can have the same modality or a different modality as the priming cue. Additionally, the alert can be a single alert or a combination of alerts that form a composition. The combination of alerts in the composition may have the same or different modalities and may or may not be separated by a period of time. Some users may receive a single alert and other users a combination of alerts, depending on the event that provides the alert, the type of alert, and/or how a user has configured his or her electronic device.

Figure 7:
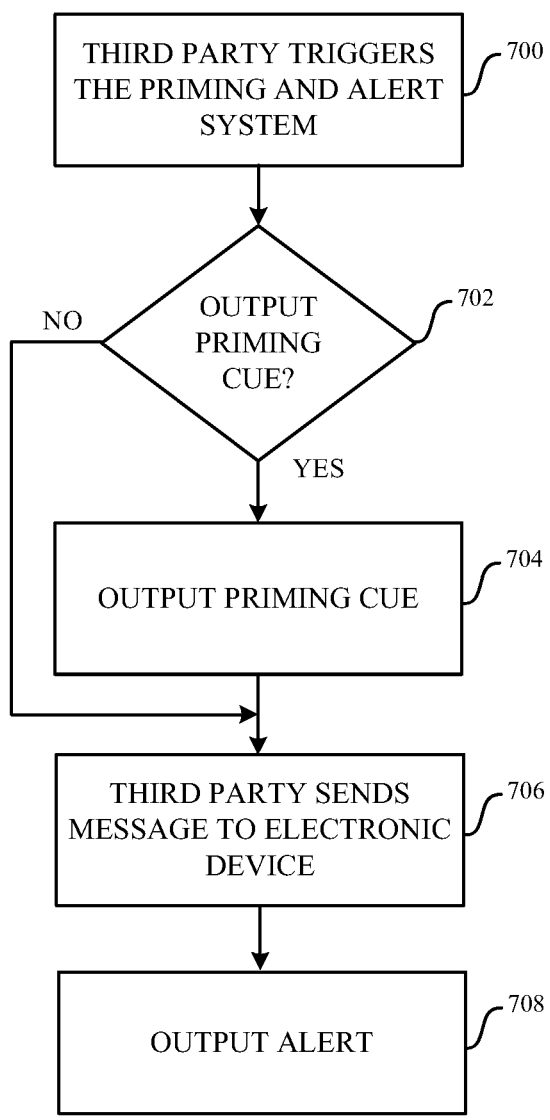
FIG. 7 is a flowchart of a method of a third party causing a priming cue to be produced before an alert is output on an electronic device.

FIG. 7 is a flowchart of a method of a third party causing a priming cue to be produced before an alert is output on an electronic device. Initially, a third party may trigger the priming and alert system at block 700. As one example, a processing device associated with the third party (e.g., processing device 230 in FIG. 2) may transmit a signal that activates the priming and alert system in a user's electronic device.

A determination may then be made at block 702 as to whether or not a priming cue is to be produced. If not, the process passes to block 706. If a priming cue is to be produced, a priming cue may then be output at block 704. In some embodiments, the third party may select the type of priming cue (e.g., haptic, audio, visual, or combinations thereof) to be provided to the user. Alternatively, the type of priming cue that is presented to the user can be based on how the user has configured his or her electronic device (e.g., with a preferences menu).

Next, as shown in blocks 706 and 708, the third party can transmit a message to the electronic device and an alert may be output in conjunction with the message. Again, the third party may select the type of alert (e.g., haptic, audio, visual, or combinations thereof) to be provided to the user. Alternatively, the type of alert that is presented to the user can be based on how the user has configured his or her electronic device.

As one example, the Emergency Alert System may trigger the priming and alert system in the event of a national or regional emergency. Alternatively, a wireless emergency alert system such as the AMBER alert system can trigger the priming and alert system in an electronic device. As another example, a restaurant may trigger the priming and alert system to inform a user that a table is available for the user. Additionally, a transportation system, such as an airline or light rail system can trigger the priming and alert system to inform a user that the plane is boarding or a light rail train is arriving or departing from a station.

Figure 8:
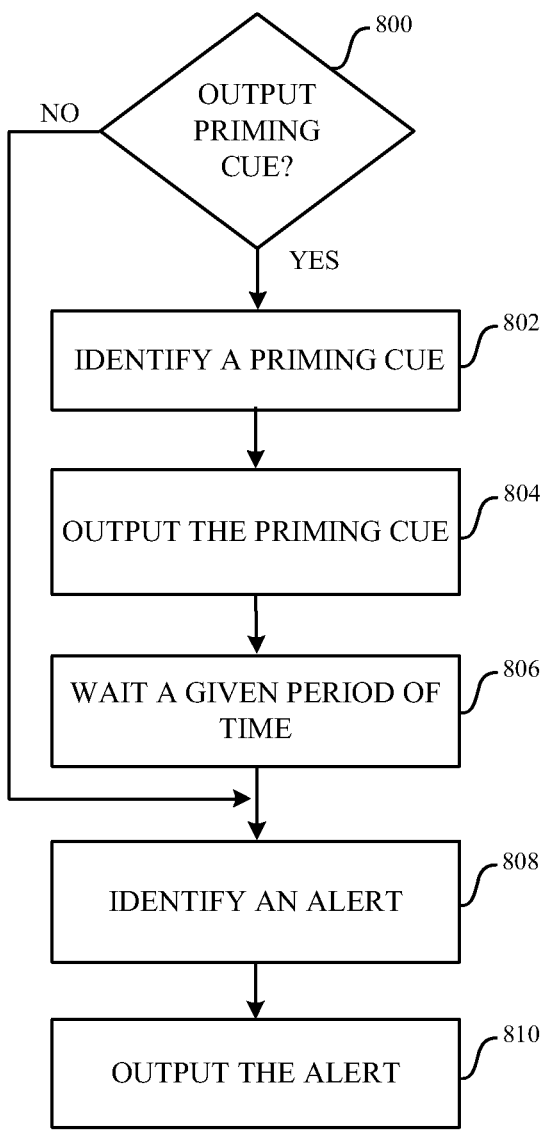
FIG. 8 is a flowchart of a method of identifying and outputting priming cues and alerts.

Referring now to FIG. 8, there is shown a method of identifying and outputting priming cues and alerts. The method of FIG. 8 can be used in conjunction with any one of the methods shown in FIGS. 4-7. Initially, as shown in block 800, a determination can be made as to whether or not a priming cue is to be output. If not, the process continues at block 808. If a priming cue is to be produced, the type of priming cue is identified at block 802. The type of priming cue may be identified based on one or more factors. As one example, the type of alert to be produced can influence the type of priming cue identified at block 802. Additionally or alternatively, the type of priming cue can be based on a preference set by the user. As one example, the user can select the actions that result in the generation of a priming cue, and associate different types of priming cues with the select actions. One type of priming cue can be generated for the receipt of an email while another type of priming cue is output for the receipt of a text message.

In some embodiments, the type of priming cue identified at block 802 may be a default priming cue set by a device manufacturer or by the user. Environmental conditions can influence the type of priming cue identified at block 802. For example, output from one or more sensors can be used to determine the type of priming cue. For example, in a dark environment, there may be no need for a priming cue to precede a visual alert because the impact of the visual alert will be magnified under the circumstances. The same is true with respect to an audio alert in a quiet environment. Conversely, some environmental factors (e.g., noise, light) may increase the likelihood that the device will initiate a priming cue. Alternatively, a priming cue that is more likely to be perceived by the user can be selected based on temperature or humidity. For example, at lower temperatures it may be difficult for a user to perceive a priming cue due to additional clothing (heavy coat and hat or earmuffs) and/or because the colder temperatures reduces a user's sensitivity to the priming cue. In this example situation, a priming cue that the user is more likely to perceive may be selected (e.g., by a processing device).

Additionally or alternatively, as described earlier, an electronic device may detect a user has not interacted with the electronic device within a given period of time and use this information to identify a type of priming cue. For example, a user may not have provided an input on a touch screen for a given period of time, may not have provided a voice command to the device recently, or may have provided (or not) some other type of input within a period. As another option, the device may determine aspects of an environment through environmental sensors and use that data to determine the type of a priming cue that would facilitate perception of the alert. In some embodiments, a motion sensor may be used to determine if a user is walking, running, or engaging in physical activity. If so, the device may identify a priming cue that is more likely to be perceived by the user.

The identified priming cue is then output at block 804. A given period of time may optionally pass at block 806 before a type of alert is identified at block 808. Like the priming cue, the type of alert may be identified based on one or more factors. If a priming cue is produced at block 804, one factor that can influence the type of alert identified at block 808 is the type of priming cue that is output at block 804. Additionally or alternatively, one or more of the example factors described in conjunction with identifying the type of priming cue can be used by the electronic device to identify an alert type at block 808. The identified alert is then output at block 810.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

We claim:

1. An electronic device, comprising:
a haptic priming and alert system;
a processing device operably connected to the haptic priming and alert system and adapted to:
detect an occurrence of a first event associated with a first haptic alert having a first predetermined sequence of haptic components;
in response to detecting the occurrence of the first event, cause the haptic priming and alert system to output a default haptic priming cue before producing the first haptic alert;
detect an occurrence of a second event different from the first event and associated with a second haptic alert having a second predetermined sequence of haptic components different from the first predetermined sequence of haptic components; and
in response to detecting the occurrence of the second event, cause the haptic priming and alert system to output the default haptic priming cue before producing the second haptic alert; wherein:
the default haptic priming cue, the first haptic alert, and the second haptic alert cause the electronic device to vibrate; and
the default haptic priming cue has a maximum amplitude that is less than an amplitude of the first haptic alert and less than an amplitude of the second haptic alert.

2. The electronic device as in claim 1, wherein the processing device is further adapted to cause the haptic priming and alert system to produce the first haptic alert in response to detecting the occurrence of the first event and after outputting the default haptic priming cue.

3. The electronic device as in claim 2, wherein the first haptic alert is separated in time from the default haptic priming cue by a time delay.

4. The electronic device as in claim 3, wherein the processing device is further adapted to determine a length of the time delay based on at least one of a duration or an intensity of the default haptic priming cue.

5. The electronic device as in claim 4, wherein:
the time delay has a first length if the default haptic priming cue has a first duration; and
the time delay has a second length greater than the first length if the default haptic priming cue has a second duration greater than the first duration.

6. The electronic device as in claim 2, wherein the processing device is further adapted to cause the haptic priming and alert system to produce the second haptic alert in response to detecting the occurrence of the second event and after outputting the default haptic priming cue.

7. The electronic device as in claim 6, wherein:
the first haptic alert is separated in time from the default haptic priming cue by a first time delay; and
the second haptic alert is separated in time from the default haptic priming cue by a second time delay.

8. The electronic device as in claim 7, wherein the first time delay and the second time delay are the same length.

9. The electronic device as in claim 1, wherein the default haptic priming cue has at least one of a distinct frequency and/or pattern from both the first haptic alert and the second haptic alert.

10. A method for priming haptic alerts provided by an electronic device, the method comprising:
detecting an occurrence of a first event associated with a first haptic alert having a first predetermined sequence of haptic components;
in response to detecting the occurrence of the first event, outputting, by the haptic priming and alert system, a default haptic priming cue before producing the first haptic alert;
detecting an occurrence of a second event different from the first event and associated with a second haptic alert having a second predetermined sequence of haptic components different from the first predetermined sequence of haptic components; and in response to detecting the occurrence of the second event, outputting, by the haptic priming and alert system, the default haptic priming cue before producing the second haptic alert; wherein:

the default haptic priming cue, the first haptic alert, and the second haptic alert cause the electronic device to vibrate; and the default haptic priming cue has a maximum amplitude that is less than an amplitude of the first haptic alert and less than an amplitude of the second haptic alert.

11. The method as in claim 10, further comprising, in response to detecting the occurrence of the first event, producing, by the haptic priming and alert system, the first haptic alert after outputting the default haptic priming cue.

12. The method as in claim 11, wherein the first haptic alert is separated in time from the default haptic priming cue by a time delay.

13. The method as in claim 12, further comprising determining a length of the time delay based on at least one of a duration or an intensity of the default haptic priming cue.

14. The method as in claim 13 wherein:

the time delay has a first length if the default haptic priming cue has a first duration; and the time delay has a second length greater than the first length if the default haptic priming cue has a second duration greater than the first duration.

15. The method as in claim 11, further comprising, in response to detecting the occurrence of the second event, producing, by the haptic priming and alert system, the second haptic alert after outputting the default haptic priming cue.

16. The method as in claim 15, wherein:

the first haptic alert is separated in time from the default haptic priming cue by a first time delay; and the second haptic alert is separated in time from the default haptic priming cue by a second time delay.

17. The method as in claim 16, wherein the first time delay and the second time delay are the same length.

18. The method as in claim 10, wherein the default haptic priming cue has at least one of a distinct frequency and/or pattern from both the first haptic alert and the second haptic alert.

19. An electronic device, comprising:

a haptic priming and alert system;

a processing device operably connected to the haptic priming and alert system and adapted to:

detect an occurrence of a first event associated with a first haptic alert having a first predetermined sequence of haptic components;

in response to detecting the occurrence of the first event, determine whether to output a haptic priming cue before the first haptic alert based on at least one of:

an elapsed time from a user interaction with the electronic device;

a detected user activity;

a motion of the electronic device; or an operational state of the electronic device; and in response to a determination to output the haptic priming cue, cause the haptic priming and alert system to output the haptic priming cue before producing the first haptic alert;

detect an occurrence of a second event different from the first event; and in response to detecting the occurrence of the second event, cause the haptic priming and alert system to output the haptic priming cue before producing a second haptic alert, the second haptic alert having a second predetermined sequence of haptic components different from the first predetermined sequence of haptic components; wherein:

the haptic priming cue, the first haptic alert, and the second haptic alert cause the electronic device to vibrate; and the haptic priming cue has a maximum amplitude that is less than an amplitude of the first haptic alert and less than an amplitude of the second haptic alert.

20. The electronic device as in claim 19, wherein the first haptic alert is offset in time from the haptic priming cue by a period of time based on one or more characteristics of the haptic priming cue.

* * * * *